UNITED STATES PATENT OFFICE.

SAMUEL LEWIS SUMMERS, OF PHILADELPHIA, PENNSYLVANIA.

ACET SALICYL PHENETIDIN AND PROCESS OF MAKING SAME.

SPECIFICATION forming part of Letters Patent No. 706,355, dated August 5, 1902.

Application filed March 24, 1902. Serial No. 99,793. (No specimens.)

*To all whom it may concern:*

Be it known that I, SAMUEL LEWIS SUMMERS, a citizen of the United States, residing in the city of Philadelphia, State of Pennsylvania, have invented certain new and useful Improvements in Acet Salicyl Phenetidin and Process of Producing the Same, of which the following is a full, clear, and exact description.

My invention relates to the production of a new chemical compound and to a process of producing the same. The new resultant chemical body has especial utility as a pharmaceutical product in that it possesses valuable medicinal properties as a febrifuge, analgesic, antineuralgic, administered internally, and decided and marked "antiseptic," applied externally. Stated briefly, it is essentially an acet salicyl phenetidin—that is to say, a crystalline derivative of paraphenetidin formed by the substitution of two distinct and different acid radicals—namely, acetic acid and salicylic acid for two of hydrogen in the $NH_2$ group in the amidophenetol acted on.

It has been well known for many years that the acetyl derivatives of certain amins, notably of ethoxy para and ortho amidophenol, as also salicylic acid compounds, possess valuable medicinal properties each having its own peculiar therapeutic effects. My chemical researches and clinical tests have established the fact that the valuable medicinal properties of the acetyl derivative of the ethoxy compounds of para and ortho amidophenol and those of the acetyl salicyl or other salicylic acid compounds will when exhibited by my new chemical compound of certain varieties of these bodies be combined and modified each by the other, resulting in increasing the activity and augmenting the therapeutic effects of each and without the hitherto-observed deleterious effects of either, notably cardiac depression and sweating, commonly exhibited as the effect of phenacetin and acetanilid. Hence the object of my invention is to unite the medicinal properties of these bodies in a new and modified form and by a new chemical union of paraphenetidin with acetic acid and brom-salicylic acid. I have discovered such a distinctively new compound having the formula $C_{17}H_{17}NO_5$, and it differs materially from all other acid derivatives of paraphenetidin in that it not only has the acetyl radical in the amido group, but has the salicylic-acid molecule attached by loss of hydrogen of the nucleus and without loss of either the phenolic or acid hydroxyl. The new compound is therefore in one aspect of it essentially a phenolic salicyl body. I will now describe my process of producing it.

Acetic anhydrid or other equivalent acetylizing agent is allowed to react on para amidophenetol in one of the well-known ways with reflux condenser, the product of the reaction being a reddish-white crystalline mass melting at 122° to 125° centigrade and containing the monoacetyl paraphenetidin admixed with side products. I then prepare a mono brom-salicylic acid, the variety of which, as used by me, is the 1, 2, 5 compound, (having reference to the benzene ring,) made by adding one molecule of salicylic acid to one molecule $(Br^2)$ of bromin in carbon disulfid solution, although any other of the several isomeric brom-salicylic acids would give an analogous reaction. This mixture of salicylic acid and bromin solution is allowed to stand until fumes of bromin no longer show upon evaporation of a test portion. The carbon disulfid and hydrobromic acid are then driven off and the brom-salicylic acid crystallized out of hot water. I then heat approximately one molecule, (one hundred and eighty parts, by weight,) of the unpurified reddish-brown crystalline product of the acetylizing reaction on paraphenetidin, first above referred to, with one molecule, (two hundred and seventeen parts, by weight,) of the last-mentioned brom-salicylic acid to a temperature of about 140° centigrade. Hydrobromic acid forms, according to the reaction:

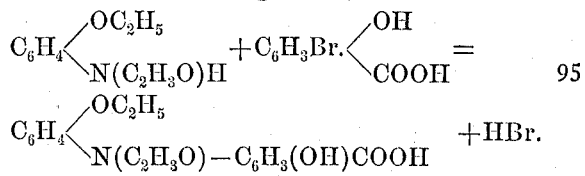

To neutralize the hydrobromic acid as formed, sodium carbonate or other alkaline compound may be added; but I do not consider it an essential part of the process, as I have formed the compound without it. The heating is continued until acid vapors are no longer evolved. When the reaction is complete, the mass is allowed to cool, and the crystalline body sought for is extracted in a purified state, isolated from all side products by means of ligroin, petroleum, spirit, or other suitable solvent; but not with hot water, which latter has a tendency to decompose it. The purified product forms white satin-like crystals, having a slightly-astringent taste, melting at about 92°, centigrade soluble in ether, alcohol, and benzol, and may be identified as a product by these characteristics.

Having thus described my invention, what I claim as new, and desire to secure by Letters Patent, is—

1. As a new product the acet salicyl paraphenetidin herein described, which has the formula $C_{17}H_{17}NO_5$, melting at 92° centigrade, forming in white satin-like crystals, slightly astringent to the taste, and soluble in ether, alcohol and benzol.

2. The process of producing the acet salicyl paraphenetidin herein described, which consists in heating one molecule of acet paraphenetidin with one molecule of brom-salicylic acid to a temperature of about 140° centigrade, until all acid vapors cease, then allowing the mass to cool, and finally extracting the crystalline body in a purified state by means of a suitable solvent.

In testimony whereof I have hereunto affixed my signature this 18th day of March, A. D. 1902.

SAMUEL LEWIS SUMMERS.

Witnesses:
WM. H. SUTTON,
AUGUSTUS F. W. PLITT.